United States Patent
Shousha et al.

(10) Patent No.: US 11,146,105 B2
(45) Date of Patent: Oct. 12, 2021

(54) DEVICE FOR OBTAINING ELECTRIC ENERGY AND ENERGY GENERATOR COMPRISING SUCH A DEVICE

(71) Applicant: Würth Elektronik eiSos GmbH & Co. KG, Waldenburg (DE)

(72) Inventors: Mahmoud Shousha, Eching (DE); Martin Haug, Munich (DE)

(73) Assignee: Würth Elektronik eiSos GmbH & Co. KG, Waldenburg (DE)

( * ) Notice: Subject to any disclaimer, the term of this patent is extended or adjusted under 35 U.S.C. 154(b) by 0 days.

(21) Appl. No.: 16/964,016

(22) PCT Filed: Jan. 9, 2019

(86) PCT No.: PCT/EP2019/050440
§ 371 (c)(1),
(2) Date: Jul. 22, 2020

(87) PCT Pub. No.: WO2019/154576
PCT Pub. Date: Aug. 15, 2019

(65) Prior Publication Data
US 2021/0036548 A1 Feb. 4, 2021

(30) Foreign Application Priority Data

Feb. 7, 2018 (DE) ............ 10 2018 201 925.8

(51) Int. Cl.
*H01F 27/42* (2006.01)
*H01F 37/00* (2006.01)
(Continued)

(52) U.S. Cl.
CPC ............ *H02J 50/001* (2020.01); *H02M 3/07* (2013.01); *H02M 7/217* (2013.01)

(58) Field of Classification Search
CPC . H02J 5/005; H02J 7/025; H02J 17/00; H01F 38/14; B60L 11/182; H02M 1/22;
(Continued)

(56) References Cited

U.S. PATENT DOCUMENTS 8,467,206 B2 6/2013 Iturriz et al.
9,413,261 B2 8/2016 Usami
(Continued)

FOREIGN PATENT DOCUMENTS

CN          101965678 B      7/2013
DE    10 2008 064 402 A1    7/2010
(Continued)

OTHER PUBLICATIONS

Rohan Dayal et al. "Design and Implementation of a Direct AC-DC Boost Converter for Low-Voltage Energy Harvesting" IEEE Transactions on Industrial Electronics, IEEE Service Center, Piscataway, NJ, USA, vol. 58, No. 6, Jun. 1, 2011 (Jun. 1, 2011), pp. 2387-2396.
(Continued)

*Primary Examiner* — Quan Tra
(74) *Attorney, Agent, or Firm* — McGlew and Tuttle, P.C.

(57) ABSTRACT

A device for harvesting electrical energy includes a rectifier and a control device. The rectifier includes a first charging circuit for harvesting energy from a positive voltage of an energy harvester, and a second charging circuit for harvesting energy from a negative voltage of the energy harvester. The charging circuits include a common coil and a common electronic switch. Furthermore, each of the charging circuits includes a capacitor and a blocking element. Because the charging circuits use the coil jointly, the device is designed in a simple and compact manner. In addition, the energy harvesting is efficient, due to the one-stage AC-DC conversion and due to a maximum power point tracking function of the control device.

24 Claims, 9 Drawing Sheets

(51) Int. Cl.
*H01F 38/00* (2006.01)
*H02J 50/00* (2016.01)
*H02M 3/07* (2006.01)
*H02M 7/217* (2006.01)

(58) Field of Classification Search
CPC ............ H02M 1/20; H02M 1/30; H02M 7/54; H02M 1/24
USPC .......................................... 307/104; 363/108
See application file for complete search history.

(56) References Cited

U.S. PATENT DOCUMENTS

| | | | |
|---|---|---|---|
| 2005/0073860 A1 | 4/2005 | Yang et al. | |
| 2015/0035512 A1 | 2/2015 | Kim et al. | |
| 2015/0318781 A1* | 11/2015 | Huang | H02M 7/12 363/44 |
| 2016/0099660 A1* | 4/2016 | Khaligh | H02M 7/217 363/126 |
| 2017/0271904 A1 | 9/2017 | Ziv | |
| 2018/0019661 A1 | 1/2018 | Gao et al. | |

FOREIGN PATENT DOCUMENTS

| | | |
|---|---|---|
| TW | 201126888 A | 8/2011 |
| TW | 201220665 A | 5/2012 |
| WO | 03/065539 A1 | 8/2003 |
| WO | 2011/052364 A1 | 5/2011 |
| WO | 2013050619 A1 | 4/2013 |
| WO | 2017/020189 A1 | 2/2017 |

OTHER PUBLICATIONS

Hsieh Chen-Yu et al. "A simple Bi-directional bridgeless AC/DC buck-boost converter for automotive energy harvesting" IECON 2014—40th Annual Conference of the IEEE Industrial Electronics Society, IEEE, Oct. 29, 2014 (Oct. 29, 2014), pp. 1937-1943.

Md. Jahid Hasan et al. "High Efficiency Boost Rectifier (Bridgeless) for Energy Harvesting" International Journal of Advanced Research in Electrical Electronics and Instrumentation Engineering, vol. 03, No. 08, Oct. 20, 2014 (Oct. 20, 2014), pp. 12288-12295.

Haoyu Wang et al. "A Bridgeless Boost Rectifier for Low-Voltage Energy Harvesting Applications" IEEE Transactions on Power Electronics, Institute of Electrical and Electronics Engineers, USA, vol. 28, No. 11, Nov. 1, 2013 (Nov. 1, 2013), pp. 5206-5214.

R. Dayal and L. Parsa, "A new single stage AC-DC converter for low voltage electromagnetic energy harvesting," 2010 IEEE Energy Conversion Congress and Exposition, Atlanta, GA, 2010, pp. 4447-4452.

* cited by examiner $Z_{1p} : 0 < t < D \cdot T_S$ $Z_{2p} : D \cdot T_S < t < (1-D) \cdot T_S$ $Z_{1n} : 0 < t < D \cdot T_S$ $Z_{2n} : D \cdot T_S < t < (1-D) \cdot T_S$

DEVICE FOR OBTAINING ELECTRIC ENERGY AND ENERGY GENERATOR COMPRISING SUCH A DEVICE

CROSS-REFERENCES TO RELATED APPLICATIONS

This application claims the priority of the German patent application, Ser. No. 10 2018 201 925.8, filed on Feb. 7, 2018, the content of which is incorporated herein by reference in its entirety as if fully set forth herein.

FIELD OF THE INVENTION

The present invention relates to a device for harvesting electrical energy, and an energy generator comprising such a device.

BACKGROUND OF THE INVENTION

Energy harvesting refers to the harvesting of small amounts of electrical energy from sources in the environment of a mobile electrical device, for example, from vibrations or movements. Corresponding energy harvesters, for example, piezoelectric generators or electromagnetic energy harvesters, provide a small voltage having an alternating polarity (AC voltage), from which electrical energy is to be harvested and utilized in a manner which is efficient as possible.

SUMMARY OF THE INVENTION

An object of the present invention is to provide a simply and compactly designed device which enables the harvesting of electrical energy in an efficient and reliable manner. The device is in particular to enable efficient harvesting of electrical energy from an extremely low voltage in the millivolt range.

This object is achieved via a device for harvesting electrical energy, comprising
- a rectifier comprising
  - a first input terminal and a second input terminal for connecting to an energy harvester,
  - a first output terminal and a second output terminal for providing an output voltage,
  - a first charging circuit for harvesting energy from a positive voltage of the energy harvester which is applied to the input terminals, comprising
    an electronic switch,
    a coil,
    a first capacitor, and
    a first blocking element,
  - a second charging circuit for harvesting energy from a negative voltage of the energy harvester which is applied to the input terminals, comprising
    the electronic switch,
    the coil,
    a second capacitor, and
    a second blocking element,
- a control device for actuating the electronic switch.

The rectifier comprises a first charging circuit for harvesting energy from a positive voltage of the energy harvester which is applied to the input terminals, and a second charging circuit for harvesting energy from a negative voltage of the energy harvester which is applied to the input terminals, said charging circuits comprising a common coil and a common electronic switch. In the case of a positive voltage being applied, the electronic switch is closed in a first switching state, so that the coil stores energy due to the applied positive voltage and the current flowing through the coil. The first blocking element prevents the first capacitor from being charged in the first switching state. The first blocking element is in particular configured as a diode. In a subsequent, second switching state, the electronic switch is open, so that the first capacitor is charged by means of the energy stored in the coil. In the second switching state, the first blocking element allows the flow of a charging current from the coil to the first capacitor. If the negative voltage is applied, the electronic switch is closed in a first switching state, so that the coil stores energy due to the applied negative voltage and the current flowing through the coil. In the first switching state, the second blocking element prevents the second capacitor from being charged. The second blocking element is in particular configured as a diode. In a subsequent, second switching state, the electronic switch is open, so that the second capacitor is charged by means of the energy stored in the coil. In the second switching state, the second blocking element allows the flow of a charging current from the coil to the second capacitor.

Because the rectifier comprises only a single coil which is used jointly by the charging currents if a positive voltage is applied and if a negative voltage is applied, the rectifier is designed in a simple and compact manner. The cost of the device is essentially a function of the magnetic volume which is defined by the common coil. Because the rectifier comprises exactly one coil, the magnetic volume is limited to the volume of the single coil, such that the cost of the device is comparatively low. In addition, the applied AC voltage is converted to a voltage having the same polarity or into a DC voltage in a single step, so that the harvesting of electrical energy takes place in an efficient and reliable manner. The input terminals are not directly connected to a diode of the rectifier, so that an extremely low voltage provided by the energy harvester can also be rectified and utilized in a simple and efficient manner. The rectifier is in particular configured as a buck-boost converter.

The charging circuits use the electronic switch jointly and in a corresponding manner. The electronic switch comprises at least one electronic switching element. The at least one electronic switching element is in particular configured as a MOSFET, preferably as a normally-off n-channel MOSFET. The first switching state and the subsequent, second switching state extend over a period $T_s$. The following is true for the period $T_s$: $T_s = 1/f_s$, where $f_s$ denotes a switching frequency of the control device. The respective first switching state has the duration $D \cdot T_s$, and the respective associated second switching state has a duration of $(1-D) \cdot T_s$, where D is a duty cycle.

A device, in which the coil and the electronic switch are connected in series, ensures a simple and compact design and efficient energy harvesting. The series circuit which is made up of the coil and the electronic switch is connected to the input terminals. If the electronic switch is closed, the series circuit forms a loop from the coil and the electronic switch, together with an energy harvester which is connected to the input terminals. As a result, a current flows through the coil due to the voltage which is applied to the input terminals, so that energy is stored by means of the coil. In the subsequent, second switching state, the electronic switch is open, so that the connection of the coil to one of the input terminals is disconnected due to the series circuit, and the loop is therefore broken. As a result, in the second switching state, charging of the first capacitor or the second capacitor is made possible. Preferably, the coil is connected to the first input terminal and the electronic switch, and the electronic switch is connected to the secand input terminal.

A device, in which the electronic switch comprises a series circuit which is made up of a first electronic switching element and a second electronic switching element, ensures high reliability and efficiency. As a result of two electronic switching elements being connected in series, parasitic currents and losses caused thereby are avoided. The two electronic switching elements have in particular a back-to-back arrangement. Losses and malfunction as a result of parasitic currents are thereby avoided. Parasitic currents are caused in particular by body diodes. Due to the back-to-back arrangement, the body diodes have different blocking directions. The electronic switching elements are selected from the group including field-effect transistors (n-channel or p-channel) and bipolar transistors (NPN or PNP). The electronic switching elements are preferably configured as MOSFETs, in particular as n-channel MOSFETs.

A device, in which the electronic switch comprises at least one body diode which is connected in parallel with a respective electronic switching element, ensures a simple design and high reliability. The electronic switch comprises at least one electronic switching element having an associated parasitic body diode. When starting operation of the rectifier, the parasitic body diode is used to supply the control device with electrical energy. For this purpose, a supply circuit of the control device is connected to the rectifier, so that the coil, one of the capacitors, the supply circuit, and the parasitic body diode form a loop, together with the energy harvester which is connected to the input terminals. Via this loop, i.e., via the parasitic body diode, the supply circuit is charged by means of the voltage which is applied to the input terminals and/or the voltage of a galvanic energy store, so that a supply voltage is provided by the supply circuit for generating the control signals. The supply circuit is connected in particular to one of the output terminals and a terminal of the electronic switching element. Preferably, the supply circuit is connected to the second output terminal and a source terminal of the electronic switching element which is configured as a MOSFET. A drain terminal of the electronic switching element is preferably connected to the second input terminal.

A device, in which a first body diode which is connected in parallel with the first electronic switching element, and a second body diode which is connected in parallel with the second electronic switching element, have opposite blocking directions, ensures high reliability and high efficiency. The electronic switching elements are connected in series and have a back-to-back arrangement, such that the parasitic body diodes have opposite blocking directions. By means of the arrangement of the switching elements, it is thus ensured that at least one of the body diodes blocks both in the case of an applied negative voltage and in the case of an applied positive voltage. Parasitic currents and losses caused thereby are thus avoided. Preferably, the connection between the series-connected electronic switching elements forms a reference potential (ground) of the control device, such that the electronic switching element can be easily actuated due to the defined reference potential. The electronic switching elements are preferably configured as MOSFETs which are connected to the source terminals and are connected in series in this way. The source terminals are preferably connected to a supply circuit of the control device, wherein the node configured thereby forms a reference node and is connected to the reference potential (ground). The series connection of the electronic switching elements is in particular connected to the coil and the second input terminal. The body diode of the electronic switching element which is connected to the second input terminal has in particular a forward direction which is directed to the second input terminal.

A device, in which the coil, the first capacitor, and the first blocking element comprise a first loop for transmitting energy from the coil to the first capacitor, ensures a simple and compact design and efficient energy harvesting. If a positive voltage is applied to the input terminals, the coil, the first capacitor, and the first blocking element form a first loop in a second switching state, such that the energy stored in the coil in a first switching state is transmitted from the coil to the first capacitor. In the second switching state, the first blocking element enables a flow of current from the coil to the first capacitor.

A device, in which the coil, the second capacitor, and the second blocking element comprise a second loop for transmitting energy from the coil to the second capacitor, ensures a simple and compact design and efficient energy harvesting. If a negative voltage is applied to the input terminals, the coil, the second capacitor, and the second blocking element form a second loop in a second switching state, such that the energy stored in the coil in a first switching state is transmitted from the coil to the second capacitor. In the second switching state, the second blocking element enables a current flow from the coil to the second capacitor.

A device, in which the blocking elements have different forward directions with respect to the coil, ensures a simple and compact design. Because the first blocking element and the second blocking element have different forward directions or different blocking directions with respect to the coil, the rectifier can be switched between the first charging circuit and the second charging circuit in a simple manner. In the case of an open electronic switch, a current flow takes place by means of the blocking elements, either via a first loop which comprises the coil, the first blocking element, and the first capacitor, or via a second loop which comprises the coil, the second blocking element, and the second capacitor. The blocking elements are preferably configured as diodes. The first blocking element is in particular connected to the first input terminal and the first output terminal, and enables a current flow from the coil to the first capacitor. The second blocking element is in particular connected to the first input terminal and the second output terminal, and enables a current flow from the coil to the second capacitor.

A device, in which the first capacitor is connected to the first output terminal, and the second capacitor is connected to the second output terminal, ensures efficient energy harvesting. The first capacitor is charged if a positive voltage is applied to the input terminals, and the second capacitor is charged if a negative voltage is applied to the input terminals, such that a comparatively high output voltage is provided at the output terminals even if the voltage applied to the input terminals is extremely small.

A device, in which the coil is connected to the first input terminal and a charging circuit node, the electronic switch is connected to the second input terminal and the charging circuit node, the first capacitor is connected to the charging circuit node and the first output terminal, the second capacitor is connected to the charging circuit node and the second output terminal, the first blocking element is connected to the first input terminal and the first output terminal, and the second blocking element is connected to the first input terminal and the second output terminal, ensures a simple and compact design. The energy harvester is connected to the input terminals and provides a voltage or input voltage to them. The output voltage is provided to the output terminals, via which a load can be operated. The central charging circuit node, to which the exactly one coil or the only coil, the electronic switch, and the capacitors are connected, enables the storage of electrical energy in the coil in a first switching state, and the charging of one of the capacitors with the electrical energy stored in the coil in a subsequent, second switching state, in a simple manner. The switching between the switching states takes place by means of the electronic switch. The selection between the first charging circuit if a positive voltage is applied, and the second charging circuit if a negative voltage is applied, takes place by means of the blocking elements. The selection takes place in particular automatically if the blocking elements are configured as diodes.

A device, in which the rectifier comprises a galvanic energy store which is connected to the output terminals, ensures efficient and reliable energy harvesting. The galvanic energy store is charged by means of the capacitors, and stores the harvested electrical energy. The device thus provides an output voltage to the output terminals by means of the galvanic energy store, even if the capacitors are not charged. In addition, the output voltage is stabilized by means of the galvanic energy store. The galvanic energy store is preferably connected to the output terminals. Because electrical energy which is not needed by a load is stored or stored temporarily in the galvanic energy store, the harvested energy is used in a simple and efficient manner.

A device, in which a voltage controller is connected to the output terminals, ensures reliable energy harvesting. Because a voltage controller is connected to the output terminals, a comparatively constant voltage is provided to a load. The voltage controller is in particular advantageous if no galvanic energy store is connected to the output terminals. Since the output voltage at the output terminals fluctuates due to the changing charging state of the capacitors, the voltage controller is advantageous for stabilizing the output voltage. The voltage controller comprises in particular a DC-DC converter, of which the output-side voltage is controlled. For this reason, the DC-DC converter is part of a voltage control circuit which compares the output-side voltage to a setpoint voltage, and feeds a voltage difference between the setpoint voltage and the output-side voltage to a controller, which actuates the DC-DC converter for correcting the voltage difference. The controller is, for example, configured as a PID controller.

A device, in which the control device comprises a control circuit for generating control signals, and a supply circuit for providing a supply voltage for the control circuit, ensures reliable and efficient energy harvesting. By means of the supply circuit, the control circuit provides a supply voltage in a reliable manner. The supply circuit is in particular designed in such a way that the supply voltage is as constant as possible. The supply circuit is preferably connected to one of the output terminals and is connected to the electronic switch. The supply circuit is in particular connected to the second output terminal and is connected to a connection of two electronic switching elements of the electronic switch. The node thereby formed acts as a reference node and provides a reference potential for the control circuit. The supply voltage acts as an input voltage for the control circuit. The control circuit is configured in such a way that so-called maximum power point tracking (MPPT) takes place, such that the energy harvesting is optimized or maximized. For this purpose, the control circuit adjusts a duty cycle D in such a way that an input impedance at the input terminals essentially corresponds to an internal resistance of the energy harvester, and the input impedance is essentially purely ohmic, such that the voltage at the input terminals and the associated current are essentially in phase.

A device, in which the control device comprises at least one charge pump, ensures reliable and efficient energy harvesting in a simple manner. The at least one charge pump forms a supply circuit which acts to provide a supply voltage for a control circuit. Preferably, the control device comprises exactly one charge pump if the rectifier comprises a galvanic energy store. The charge pump is in particular configured as a single stage. Preferably, the control device comprises exactly two charge pumps if the rectifier does not comprise a galvanic energy store. The exactly two charge pumps are configured in particular as an auxiliary charge pump and as a primary charge pump, wherein the auxiliary charge pump acts to start operation of the primary charge pump.

A device, in which a charge pump comprises a series circuit which is made up of a first diode and a third capacitor, ensures a simple design and reliable and efficient energy harvesting. The charge pump is in particular configured as a single stage. Preferably, the charge pump comprises exactly one diode and exactly one capacitor. Preferably, the diode is connected to the second output terminal and the capacitor, and the capacitor is connected to a reference node which is configured between two electronic switching elements of the electronic switch. The reference node in particular comprises a reference potential for a control circuit. The diode enables a current flow from the second output terminal to the reference node. The charge pump forms in particular a primary charge pump if the rectifier does not comprise a galvanic energy store.

A device, in which a charge pump is connected to one of the output terminals and a node between two series-connected electronic switching elements of the electronic switch, ensures a simple design and reliable and efficient energy harvesting. Together with an energy harvester which is connected to the input terminals, the charge pump, the coil, one of the capacitors, and a body diode of one of the electronic switching elements form a loop which enables the charge pump to start operation if a voltage is applied to the input terminals. By starting operation of the charge pump, a supply voltage is provided which enables an actuation of the electronic switch or the electronic switching elements. As a result, the device can be put into operation in a simple and reliable manner Preferably, the node forms a reference node which has a reference potential for a control circuit for generating control signals. Preferably, the charge pump is connected to the second output terminal, and the electronic switch is connected to the coil and the second input terminal. If the rectifier does not comprise a galvanic energy store, the charge pump forms a primary charge pump.

A device, in which a charge pump is connected to the input terminals, ensures a simple design and reliable and efficient energy harvesting. The charge pump ensures a reliable start of operation of the control device and reliable generation of control signals for controlling the electronic switch. The charge pump forms in particular an auxiliary charge pump which enables the start of operation of a primary charge pump and the provision of a supply voltage. The charge pump is in particular advantageous if the rectifier does not comprise a galvanic energy store.

A device, in which an auxiliary charge pump is connected to a primary charging pump, in particular a first node, enables reliable and efficient harvesting. The auxiliary charge pump is used to start operation of the primary charge pump, which provides a supply voltage for the actuation of the electronic switch. The auxiliary charge pump is in particular configured as a passive one-stage Villard charge pump. The primary charge pump is preferably configured as one stage and comprises a series circuit which is made up of a diode and a capacitor. The auxiliary charge pump is connected to the primary charge pump in such a way that the capacitor of the primary charge pump is charged by means of the auxiliary charge pump. For this purpose, the auxiliary charge pump is in particular connected to a first node which is configured between the diode and the capacitor of the primary charge pump.

A device, in which a charge pump comprises:
- a fourth capacitor which is connected to the first input terminal and a second node,
- a second diode which is connected to the second input terminal and the second node,
- a fifth capacitor which is connected to the second input terminal and a third node,
- a third diode which is connected to the second node and the third node, and
- a fourth diode which is connected to the third node, ensures a simple design and reliable and efficient energy harvesting. The charge pump is configured as a passive one-stage Villard charge pump. The charge pump forms in particular an auxiliary charge pump which is connected to a primary charge pump. For this purpose, the fourth diode is connected to the connection between a first diode and a third capacitor, i.e., to a first node. If a negative voltage is applied, the fourth capacitor is charged via the second diode. For this purpose, the second diode enables a current flow from the second input terminal to the first input terminal. If a positive voltage is applied to the input terminals, the fourth capacitor is discharged via the third diode, and the fifth capacitor is charged. For this purpose, the third diode enables a current flow from the second node to the third node. By charging the fifth capacitor, the voltage at the third node is essentially equal to twice the maximum voltage at the input terminals. The third capacitor of the primary charge pump is charged via the fourth diode, such that the third capacitor provides a supply voltage. For this purpose, the fourth diode enables a current flow from the fifth capacitor to the third capacitor.

A device, in which the supply circuit comprises an ohmic resistor which is connected in parallel with the first capacitor, ensures a simple design and reliable energy harvesting. The ohmic resistance simplifies starting operation of the supply circuit and thus the provision of a supply voltage for the actuation of the electronic switch by means of the control circuit. The supply circuit is connected to the second output terminal, such that the second capacitor is charged when operation of the supply circuit is started. If the rectifier comprises a galvanic energy store, the voltage of the galvanic energy store is applied primarily across the first capacitor, whereas the voltage across the second capacitor is low. By means of the ohmic resistor, the difference between the voltages at the first capacitor and at the second capacitor is reduced, such that the supply circuit and the control circuit can be safely put into operation. To prevent losses, the ohmic resistor is preferably chosen to have a high resistance.

A device, in which the control device comprises a first switching sequence if a positive voltage is applied to the input terminals, wherein the following is true for the first switching sequence:

|       | $Z_{1p}$ | $Z_{2p}$ |
|-------|----------|----------|
| $Q_1$ | 1        | 0        |
| $Q_2$ | 1        | 0        | where
- $Q_1$ and $Q_2$ denote two series-connected electronic switching elements of the electronic switch,
- $Z_{1p}$ and $Z_{2p}$ denote two consecutive switching states of the first switching sequence, and
- 1 means ON and 0 means OFF, ensures efficient and reliable energy harvesting if a positive voltage is applied to the input terminals. The electronic switching elements are used to switch between the first switching state and the subsequent, second switching state. In the first switching state, electrical energy is stored in the coil by means of the positive voltage which is applied to the input terminals. For this purpose, the electronic switching elements are closed in the first switching state. In the subsequent, second switching state, the first capacitor is charged by means of the stored electrical energy. The electrical switching elements are actuated synchronously. The first switching sequence extends over a period $T_s$. The following holds true for the period $T_s$: $T_s = 1/f_s$, where $f_s$ denotes a switching frequency of the control device. The first switching state has a duration of $D \cdot T_s$, and the second switching state has a duration of $(1-D) \cdot T_s$, where D denotes a duty cycle. By means of the duty cycle D, an input impedance is preferably set at the input terminals. The duty cycle D denotes the ratio of the duration of the first switching state to the overall duration of the switching states, i.e., to the period $T_s$.

A device, in which the control device comprises a second switching sequence if a negative voltage is applied to the input terminals, wherein the following is true for the second switching sequence:

|       | $Z_{1n}$ | $Z_{2n}$ |
|-------|----------|----------|
| $Q_1$ | 1        | 0        |
| $Q_2$ | 1        | 0        | where
- $Q_1$ and $Q_2$ denote two series-connected electronic switching elements of the electronic switch,
- $Z_{1n}$ and $Z_{2n}$ denote two consecutive switching states of the second switching sequence, and
- 1 means ON and 0 means OFF, ensures efficient and reliable energy harvesting if a negative voltage is applied to the input terminals. The electronic switching elements are used to switch between the first switching state and the subsequent, second switching state. In the first switching state, electrical energy is stored in the coil by means of the negative voltage which is applied to the input terminals. For this purpose, the electronic switching elements are closed in the first switching state. In the subsequent, second switching state, the second capacitor is charged by means of the stored electrical energy. The electrical switching elements are actuated synchronously. The first switching sequence extends over a period $T_s$. The following holds true for the period $T_s$: $T_s = 1/f_s$, where $f_s$ denotes a switching frequency of the control device. The first switching state has a duration of $D \cdot T_s$, and the second switching state has a duration of $(1-D) \cdot T_s$, where D denotes a duty cycle. By means of the duty cycle D, an input impedance is preferably set at the input terminals. The duty cycle D denotes the ratio of the duration of the first switching state to the overall duration of the switching states, i.e., to the period $T_s$.

A device, in which the control circuit comprises a first comparator for generating a sawtooth voltage and a second comparator for generating control signals for the electronic switch, ensures reliable and efficient energy harvesting. The control circuit enables so-called maximum power point tracking (MPPT) and thus an optimization or maximization of the harvested electrical energy, in a simple manner By means of the comparator, openloop pulse width modulation is achieved. The first comparator and/or the second comparator are operated at the supply voltage which is provided by the supply circuit. The generation of the sawtooth voltage, and the generation of the control signals by means of the sawtooth voltage, can be adjusted in a simple manner by means of the suitable selection of the ohmic resistors and/or the capacitor of the comparator, in such a way that an input impedance essentially corresponds to the inner resistance of the energy harvester. The input impedance at the input terminals is adjustable by means of a duty cycle D. The duty cycle D denotes the ratio of the duration of a first switching state to the overall duration of the switching states, i.e., to a period $T_s$. The second comparator compares the sawtooth voltage in particular to a comparison voltage which is provided by a voltage divider to which the supply voltage is applied. The voltage divider is preferably configured to be purely ohmic and comprises two ohmic resistors.

A device, in which the control circuit is configured in such a way that an input impedance at the input terminals is adjustable to the energy harvester by means of the generated control signals, ensures efficient energy harvesting. The input impedance is adjusted to an impedance or inner resistance of the energy harvester, such that the harvested electrical energy is optimized or maximized. In other words, the input impedance is adjusted in such a way that the voltage applied to the input terminals and the associated current are essentially in phase. As a result, maximum power point tracking (MPPT) takes place. The input impedance is set by means of a duty cycle D. The duty cycle D denotes the ratio of the duration of a first switching state to the overall duration of a first switching state and a subsequent, secand switching state, i.e., to a period $T_s$.

An object of the present invention is furthermore to provide a simply and compactly designed energy generator, which enables the harvesting of electrical energy in an efficient and reliable manner. The energy generator is intended in particular to enable efficient harvesting of electrical energy from an extremely low voltage in the millivolt range.

This object is achieved via an energy generator device according to the invention, and an energy harvester which is connected to the input terminals for providing an AC voltage. The advantages of the energy generator correspond to the aforementioned advantages of the device according to the present invention for harvesting electrical energy. The energy harvester is, for example, a piezoelectric energy harvester or a piezoelectric generator and/or an electromagnetic energy harvester. Preferably, the energy harvester is an electromagnetic energy harvester (EMEH). Electromagnetic energy harvesters provide a comparatively high amount of electrical energy. The comparatively low voltage of electromagnetic energy harvesters does not constitute a disadvantage for the device according to the present invention.

Additional features, advantages, and details of the present invention will result from the following description of several exemplary embodiments.

DESCRIPTION OF THE PREFERRED EMBODIMENTS

Figure 1:
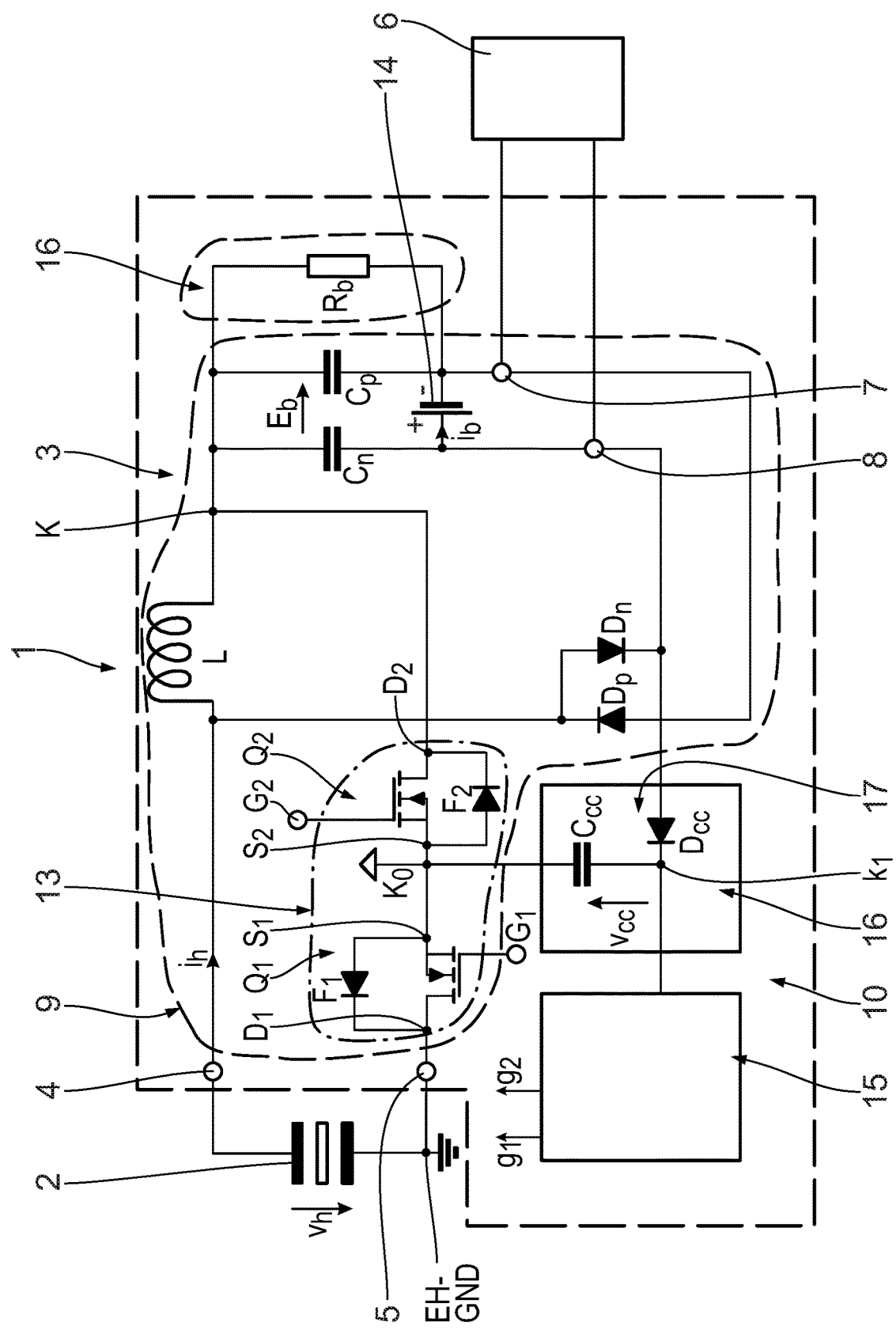
FIG. 1 depicts a schematic representation of an energy generator according to a first exemplary embodiment comprising a galvanic energy store.
Figure 2:
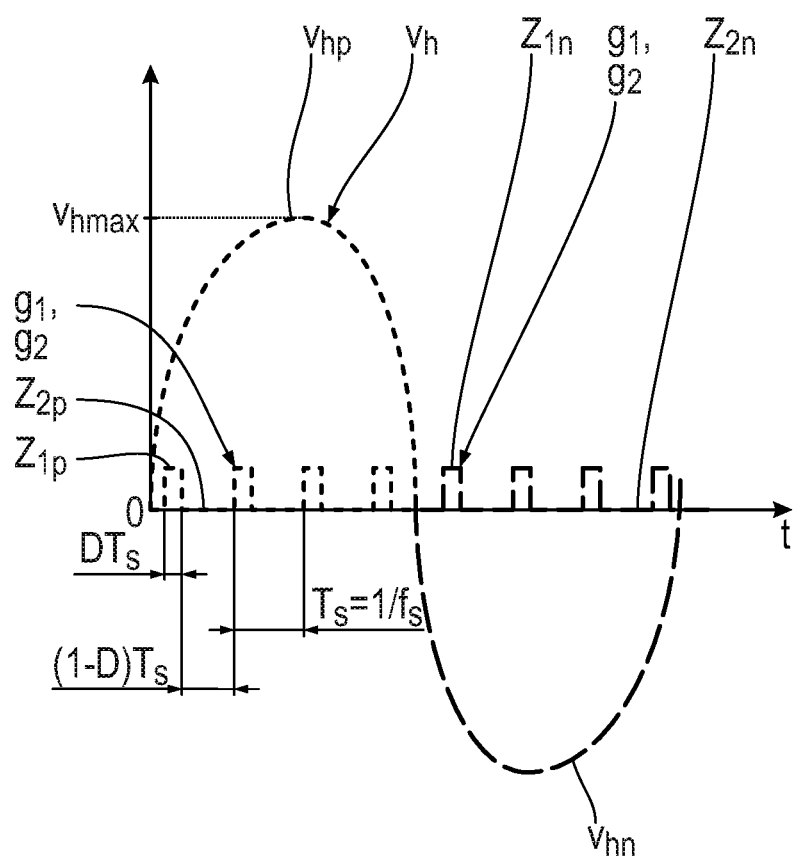
FIG. 2 depicts a time profile of a voltage provided by the energy harvester, and the control signals generated by a control device for switching between first switching states and second switching states of the energy generator.
Figure 3:
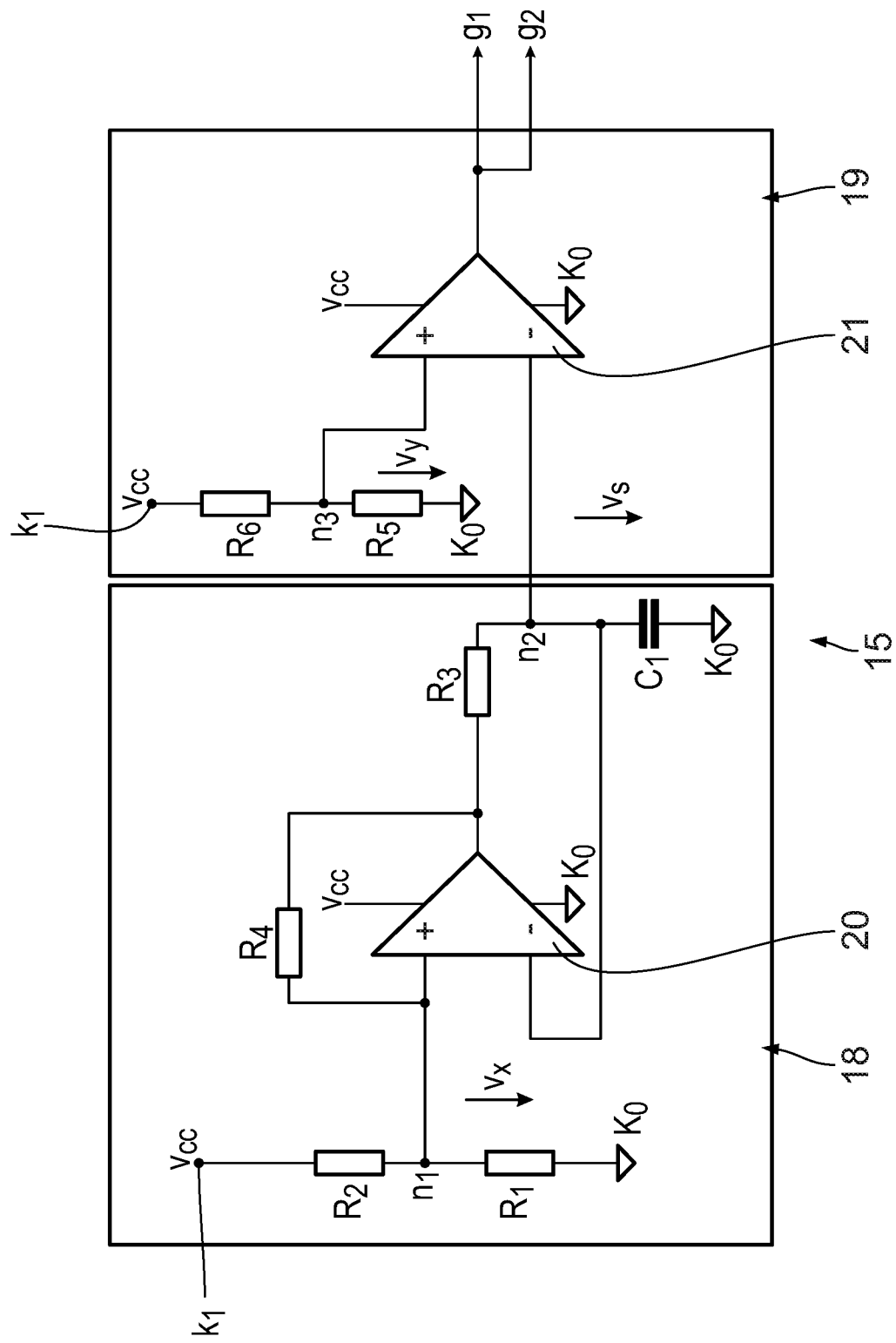
FIG. 3 depicts a schematic representation of a control circuit for generating the controls signals for an electronic switch of the energy generator.

A first exemplary embodiment of the present invention is described below with the aid of FIGS. 1 to 8. An energy generator 1 comprises an energy harvester 2 and a device 3 for harvesting electrical energy. The energy harvester 2 is configured electromagnetically. The energy harvester 2 is known and configured in a typical manner. The energy harvester 2 is also referred to as an energy harvester. The device 3 is used for utilizing or harvesting the electrical energy which is provided by the energy harvester 2. For this purpose, the energy harvester 2 is connected to a first input terminal 4 and a second input terminal 5 of the device 3. The energy generator 1 is used to provide a load 6 with electrical energy. For this purpose, the load 6 is connected to a first output terminal 7 and a second output terminal 8 of the device 3. The energy harvester 2 is connected to the input terminal 5 having a reference potential which is referred to as EH-GND (energy harvester GND).

The energy harvester 2 provides a voltage $v_h$ which has an alternating polarity (AC voltage). The voltage $v_h$ over time t is depicted by way of example in FIG. 2. The portion of the voltage $v_h$ having a positive polarity will be denoted below by $v_{hp}$, and the portion of the voltage having a negative polarity will be denoted by $v_{hn}$.

The device 3 comprises a rectifier 9 and an associated control device 10. The rectifier 9 forms a first charging circuit 11 which is used for harvesting energy from the positive voltage $v_{hp}$ of the energy harvester 2 which is applied to the input terminals 4, 5. Furthermore, the rectifier 9 forms a second charging circuit 12 which is used for harvesting energy from the negative voltage $v_{hn}$ of the energy harvester 2 which is applied to the input terminals 4, 5.

The first charging circuit 11 comprises an electronic switch 13, a coil L, a first capacitor $C_p$, and a first blocking element $D_p$. On the other hand, the second charging circuit 12 comprises the electronic switch 13, the coil L, a second capacitor $C_n$, and a second blocking element $D_n$.

The coil L is connected to the first input terminal 4 and a charging circuit node K. The electronic switch 13 is connected to the charging circuit node K and the second input terminal 5, such that the coil L and the electronic switch 13 are connected in series between the input terminals 4, 5. The first capacitor $C_p$ is connected to the charging circuit node K and the first output terminal 7 Furthermore, the first blocking element $D_p$ is connected to the first input terminal 4 and the first output terminal 7 in such a way that the first blocking element $D_p$ enables a current flow from the first output terminal 7 to the first input terminal 4. The first blocking element $D_p$ is configured as a diode. The coil L, the first capacitor $C_p$, and the first blocking element $D_p$ accordingly form a first loop $M_{p2}$. The second capacitor $C_n$ is connected to the charging circuit node K and the second output terminal 8. Furthermore, the second blocking element $D_n$ is connected to the first input terminal 4 and the second output terminal 8 in such a way that the second blocking element $D_n$ enables a current flow from the first input terminal 4 to the second output terminal 8. The second blocking element $D_n$ is configured as a diode. The coil L, the second blocking element $D_n$, and the second capacitor $C_n$ thus form a second loop $M_{n2}$. The blocking elements $D_p$ and $D_n$ thus have forward directions which are opposite with respect to the coil L, such that a current flowing through the coil L is opposite in the loops $M_{p2}$ and $M_{n2}$.

The rectifier 9 furthermore comprises a rechargeable galvanic energy store 14. The galvanic energy store 14 is connected to the first output terminal 7 and to the second output terminal 8. For this purpose, a negative terminal of the galvanic energy store 14 is connected to the first output terminal 7, and a positive terminal is connected to the second output terminal 8. An output voltage $E_b$ is provided at the output terminals 7, 8.

The electronic switch 13 is configured as a series circuit which is made up of a first electronic switching element $Q_1$ and a second electronic switching element $Q_2$. The electronic switching elements $Q_1$ and $Q_2$ are respectively configured as normally-off n-channel MOSFETs. A source terminal $S_1$ of the first switching element $Q_1$ is connected to a reference node $K_0$. The reference node $K_0$ defines a reference potential of the control device 10 (control circuit GND). A drain terminal $D_1$ of the first switching element $Q_1$ is connected to the second input terminal 5. Furthermore, a source terminal $S_2$ of the second switching element $Q_2$ is connected to the reference node $K_0$. A drain terminal $D_2$ of the second switching element $Q_2$ is connected to the charging circuit node K. The reference potential of the reference node $K_0$ ensures that positive control voltages or control signals $g_1$ and $g_2$ are applied to gate terminals $G_1$, $G_2$ of the switching elements $Q_1$ and $Q_2$ with reference to the associated source terminals $S_1$ and $S_2$, if the switching elements $Q_1$ and $Q_2$ are to be switched on, and negative control voltages or control signals $g_1$ and $g_2$ are applied if the switching elements $Q_1$ and $Q_2$ are to be switched off.

A first parasitic body diode $F_1$ is configured in parallel with the first switching element $Q_1$. The first body diode $F_1$ is configured with respect to the source terminal $S_1$ and the drain terminal $D_1$ in such a way that a current flow in the direction of the first source terminal $S_1$ is blocked. Correspondingly, a second parasitic body diode $F_2$ is configured in parallel with the second switching element $Q_2$. The second body diode $F_2$ is configured with respect to the second source terminal $S_2$ and the drain terminal $D_2$ in such a way that a current flow in the direction of the second source terminal $S_2$ is blocked. The body diodes $F_1$ and $F_2$ thus have opposite blocking directions. By means of the described back-to-back arrangement of the switching elements $Q_1$ and $Q_2$, it is thus ensured that both in the case of a positive voltage and in the case of a negative voltage which is applied to the electronic switch 13, at least one of the body diodes $F_1$ or $F_2$ blocks. As a result, parasitic currents and resulting losses are avoided.

The control device 10 is used for actuating the electronic switch 13. The control device 10 comprises a control circuit 15 for generating control signals $g_1$ and $g_2$, and a supply circuit 16 for providing a supply voltage $v_{cc}$ for the control circuit 15. The control signals $g_1$, $g_2$ are control voltages.

The supply circuit 16 comprises a charge pump 17, which comprises a diode $D_{cc}$ and a capacitor $C_{cc}$. The diode $D_{cc}$ is connected to the second output terminal 8 and a first node $k_1$. The diode $D_{cc}$ enables a current flow from the second output terminal 8 to the first node $k_1$. The capacitor $C_{cc}$ is connected to the first node $k_1$ and the reference node $K_0$, such that the diode $D_{cc}$ and the capacitor $C_{cc}$ are connected in series. The charge pump 17 is configured as one stage. The supply voltage $v_{cc}$ is applied across the capacitor $C_{cc}$, i.e., between the node $k_1$ and the reference node $K_0$.

The supply circuit 16 furthermore comprises an ohmic resistor $R_b$ which is connected in parallel with the first capacitor $C_p$ and which is connected to the charging circuit node K and the first output terminal 7.

By way of example, the following values hold true for the rectifier 9 and the supply circuit 16:

| | |
|---|---|
| Inductance of the coil L | 33 µH, |
| Capacitance of the first capacitor $C_p$ | 10 µF, |
| Capacitance of the second capacitor $C_n$ | 10 µF, |
| Capacitance of the capacitor $C_{cc}$ | 0.3 µF, |
| Value of the ohmic resistor $R_b$ | 45 kΩ. |

The control circuit 15 comprises a first comparator 18 for generating a sawtooth voltage $v_s$ and a second comparator 19 for generating the control signals $g_1$, $g_2$ for actuating the electronic switching elements $Q_1$, $Q_2$. By means of the comparators 18, 19, open-loop pulse width modulation is achieved.

The first comparator 18 comprises an operational amplifier 20 which has the supply voltage $v_{cc}$ and the reference potential of the reference node $K_0$ as operating potentials. A voltage divider made up of a first ohmic resistor $R_1$ and a second ohmic resistor $R_2$ is connected to the node $k_1$. The first ohmic resistor $R_1$ is connected to the reference node $K_0$, whereas the second ohmic resistor $R_2$ is connected to the node $k_1$. A voltage $v_x$ is tapped at a node $n_1$ between the ohmic resistors $R_1$ and $R_2$ and is fed to a non-inverting input (positive input) of the operational amplifier 20. The node $n_1$ is thus connected to the non-inverting input. An output of the operational amplifier 20 is connected to an inverting input (negative input) of the operational amplifier 20 via a third ohmic resistor $R_3$. Furthermore, the output is connected to the non-inverting input of the operational amplifier 20 via an ohmic resistor $R_4$. A capacitor $C_1$ is connected to the inverting input of the operational amplifier 20 and the reference node $K_0$. The sawtooth voltage $v_s$ is applied across the capacitor $C_1$. The connection between the ohmic resistor $R_3$ and the capacitor $C_1$ thus defines a node $n_2$ to which the sawtooth voltage $v_s$ is provided.

The second comparator 19 is used for comparing the sawtooth voltage $v_s$ to a comparison voltage $v_y$. For this purpose, the second comparator 19 comprises an operational amplifier 21. The operational amplifier 21 has the supply voltage $v_{cc}$ and the reference potential at the reference node $K_0$ as operating potentials. The second comparator 19 comprises a voltage divider made up of an ohmic resistor $R_5$ and an ohmic resistor $R_6$. The voltage divider is connected to the reference node $K_0$ and the node $k_1$. For this purpose, the ohmic resistor $R_5$ is connected to the reference node $K_0$, whereas the ohmic resistor $R_6$ is connected to the node $k_1$. The comparison voltage $v_y$ is tapped between the ohmic resistors $R_5$ and $R_6$. For this purpose, a node $n_3$ between the ohmic resistors $R_5$ and $R_6$ is connected to a non-inverting input (positive input) of the operational amplifier 21. The comparison voltage $v_y$ is thus applied across the ohmic resistor $R_5$, i.e., between the node $n_3$ and the reference node $K_0$. The node $n_2$ is connected to an inverting input (negative input) of the operational amplifier 21. The control signals $g_1$ and $g_2$ are provided at an output of the operational amplifier 21. The control signals $g_1$ and $g_2$ are applied to the gate terminals $G_1$, $G_2$ of the switching elements $Q_1$ and $Q_2$.

Figure 5:
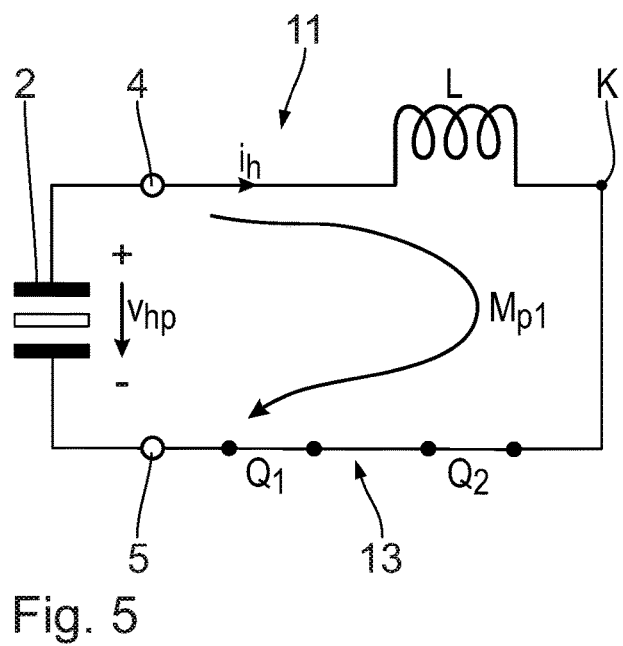
FIG. 5 depicts an equivalent circuit diagram of the energy generator in a first switching state, if an energy harvester provides a positive voltage.
Figure 6:
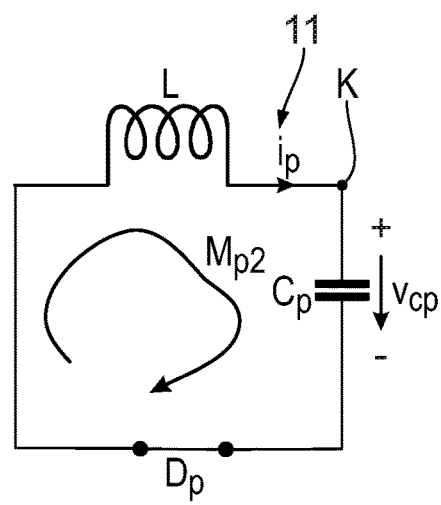
FIG. 6 depicts an equivalent circuit diagram of the energy harvester in a second switching state which follows the first switching state according to FIG. 5.

The control device 10 is configured in such a way that, if the positive voltage $v_{hp}$ is applied, a first switching sequence having a first switching state $Z_{1p}$ and a subsequent, second switching state $Z_{2p}$ are achieved. For the first switching sequence, the following is true:

|   | $Z_{1p}$ | $Z_{2p}$ |
|---|---|---|
| $Q_1$ | 1 | 0 |
| $Q_2$ | 1 | 0 | where 1 means ON and 0 means OFF. The switching state $Z_{1p}$ is illustrated in FIG. 5, and the switching state $Z_{2p}$ is illustrated in FIG. 6.

Figure 7:
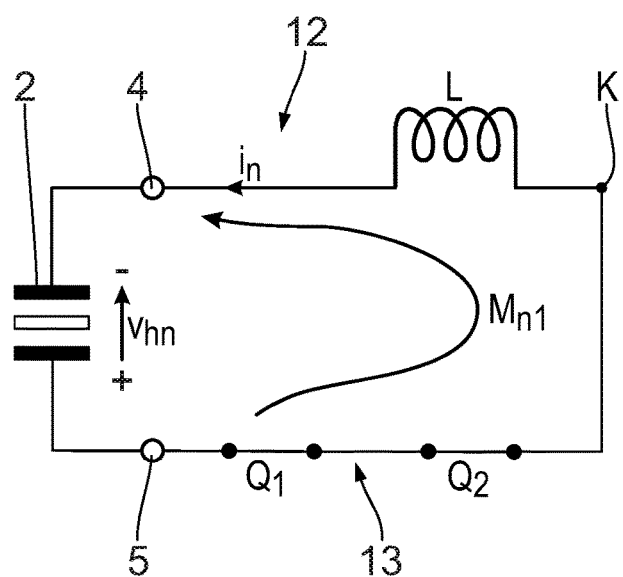
FIG. 7 depicts an equivalent circuit diagram of the energy generator in a first switching state if an energy harvester provides a negative voltage.
Figure 8:
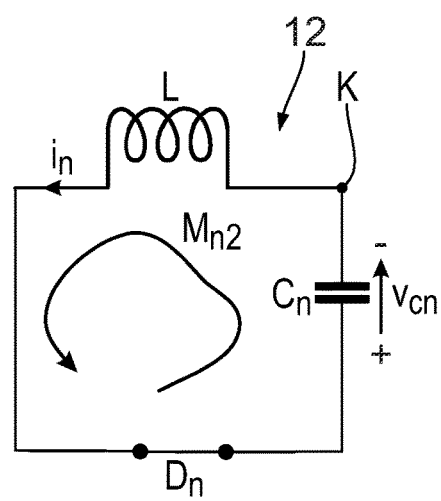
FIG. 8 depicts an equivalent circuit diagram of the energy harvester in a second switching state which follows the first switching state according to FIG. 7.
Figure 9:
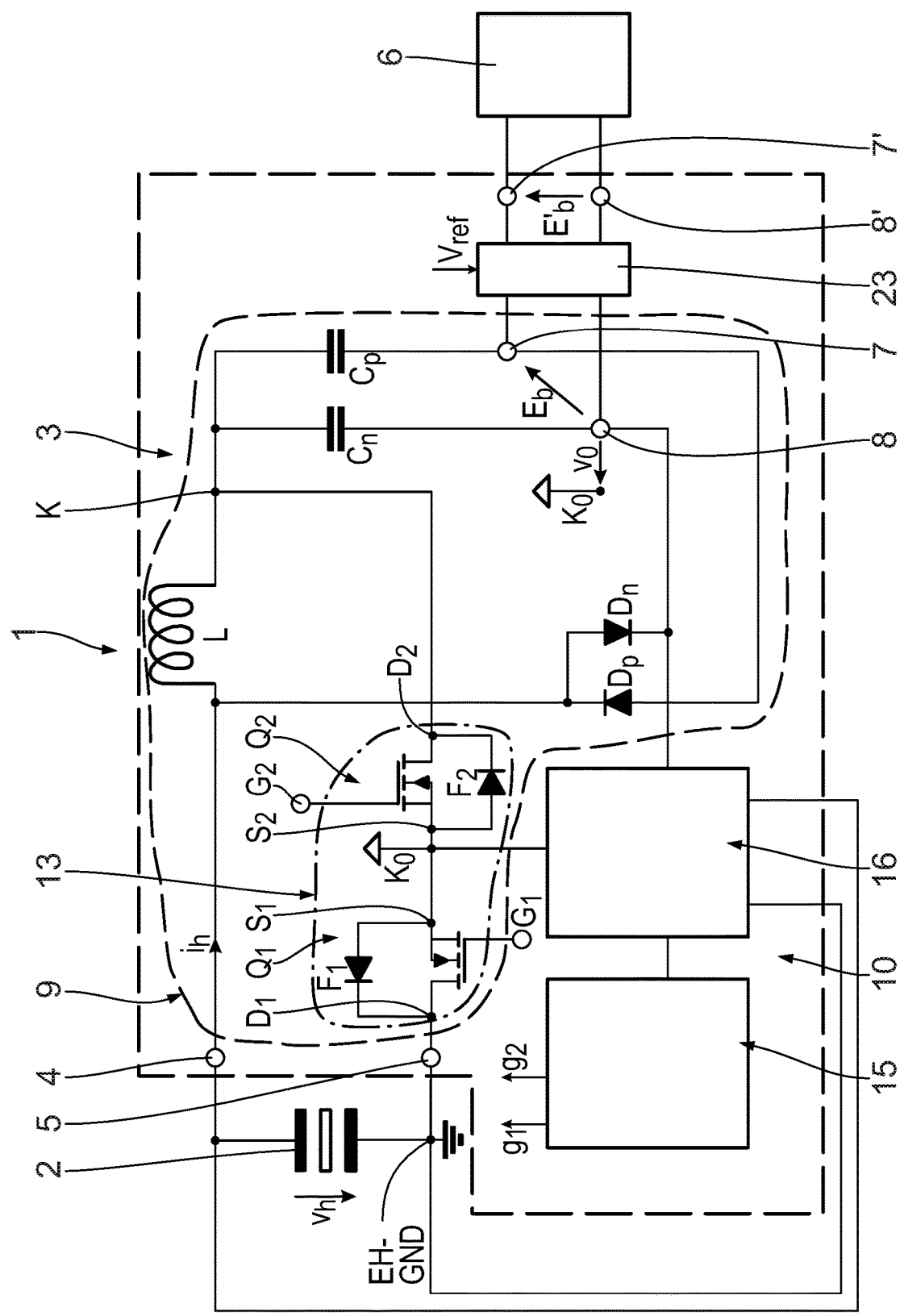
FIG. 9 depicts a schematic representation of an energy generator according to a second exemplary embodiment without a galvanic energy store.

The control device 10 is furthermore configured in such a way that, if the negative voltage $v_{hn}$ is applied, a second switching sequence having a first switching state $Z_{1n}$ and a subsequent, second switching state $Z_{2n}$ are achieved. For the second switching sequence, the following is true:

|   | $Z_{1n}$ | $Z_{2n}$ |
|---|---|---|
| $Q_1$ | 1 | 0 |
| $Q_2$ | 1 | 0 | where 1 means ON and 0 means OFF. The switching state $Z_{1n}$ is illustrated in FIG. 7, and the switching state $Z_{2n}$ is illustrated in FIG. 8.

The first switching sequence and the second switching sequence respectively extend over a period $T_s$. The following is true for the period $T_s$: $T_s = 1/f_s$, where $f_s$ denotes a switching frequency of the control device 10. The respective first switching state $Z_{1p}$ or $Z_{1n}$ has the duration $D \cdot T_s$, and the respective associated second switching state $Z_{2p}$ or $Z_{2n}$ has the duration $(1-D) \cdot T_s$, where D denotes a duty cycle.

Figure 4:
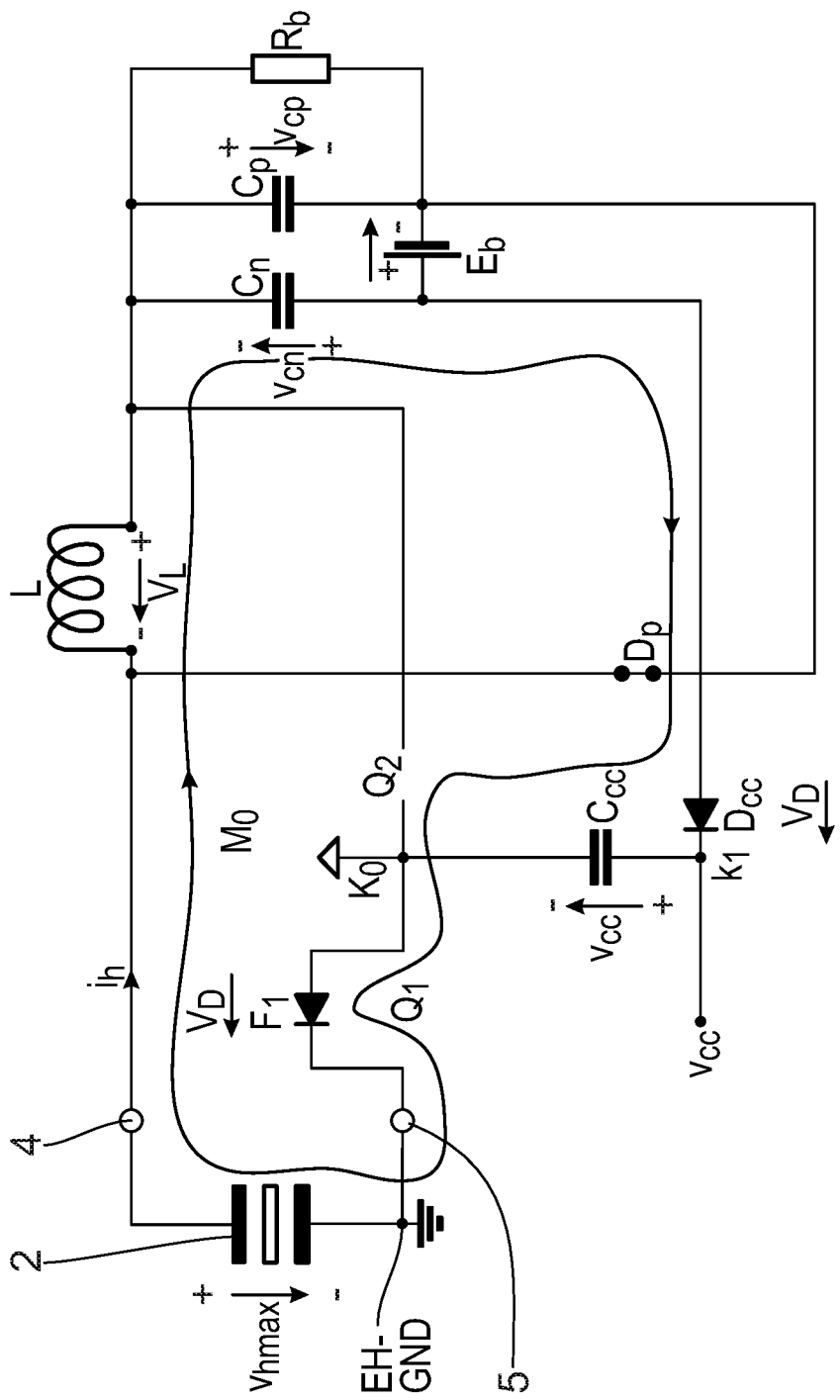
FIG. 4 depicts an equivalent circuit diagram of the energy generator during the start of operation of a supply circuit for providing a supply voltage for the control circuit.

The function of the energy generator 1 is as follows:

First, the supply circuit 16 is put into operation in order to generate the supply voltage $v_{cc}$ and to provide it to the control circuit 15. This is illustrated in FIG. 4. The supply circuit 16 is based on the single-stage charge pump 17, which uses the energy harvester 2, the coil L, and the second capacitor $C_n$ to generate a sufficient supply voltage $v_{cc}$. According to the loop $M_0$ plotted in FIG. 4, the following is true for the supply voltage $v_{cc}$:

$$v_{cc} = v_{cn} + v_L + v_{hmax} - 2 \cdot V_D = E_b + v_{hmax} - 2 \cdot V_D, \quad (1)$$

where $E_b$ denotes the output voltage or the voltage of the galvanic energy store 14, $v_{hmax}$ denotes the maximum voltage of the energy harvester 2, $V_L$ denotes the voltage across the coil L, $v_{cn}$ denotes the voltage across the second capacitor $C_n$, and $V_D$ denotes the voltage across the diodes $D_{cc}$ and $F_1$. The capacitor $C_{cc}$ is charged by means of the voltage $v_h$ of the energy harvester 2, such that a sufficient supply voltage $v_{cc}$ is provided. The ohmic resistor $R_b$ ensures that the voltage $E_b$ is distributed across the capacitors $C_p$ and $C_n$, and prevents an essentially full application of the voltage $E_b$ across the capacitor $C_p$. As a result, a reliable start of operation of the supply circuit 16 is ensured, and overloading of the capacitor $C_p$ is avoided. The ohmic resistor $R_b$ is chosen to have high resistance, such that the losses caused by the ohmic resistor $R_b$ are low.

When providing a sufficient supply voltage $v_{cc}$, the control circuit 15 generates the control signals $g_1$, $g_2$ or the control voltages $g_1$, $g_2$ for actuating the electronic switching elements $Q_1$ and $Q_2$. The energy harvester 2 generates the voltage $v_h$ from which the current $i_h$ results. If the positive voltage $v_{hp}$ is applied, the control circuit 15 achieves the first switching sequence. First, in the first switching state $Z_{1p}$, the switching elements $Q_1$ and $Q_2$ are switched on synchronously, such that the current $i_h$ in the loop $M_{p1}$ flows through the coil L. This is illustrated in FIG. 5. In the first switching state $Z_{1p}$, electrical energy is thus stored in the coil L.

In the subsequent, second switching state $Z_{2p}$, the electronic switching elements $Q_1$ and $Q_2$ are opened, such that the coil L drives a current in the loop $M_{p2}$ and charges the capacitor $C_p$, due to the stored energy. The current $i_p$ flows in the loop $M_{p2}$ via the first blocking element $D_p$, which is configured as a diode. The voltage $v_{cp}$ is applied to the first capacitor $C_p$. This is illustrated in FIG. 6. Due to the voltage $v_{cp}$, a current $i_b$ flows which charges the galvanic energy store 14.

If a negative voltage $v_{hn}$ is applied, the control circuit 15 achieves the second switching sequence. In the first switching state $Z_{1n}$, the switching elements $Q_1$ and $Q_2$ are switched on synchronously, such that the current in flows in a loop $M_{n1}$ through the coil L, and electrical energy is stored in the coil L. This is illustrated in FIG. 7. In the first switching state $Z_{1n}$, electrical energy is thus stored in the coil L.

In the subsequent, second switching state $Z_{2n}$, the electronic switching elements $Q_1$ and $Q_2$ are opened, such that the coil L drives a current in the loop $M_{n2}$ and charges the capacitor $C_n$, due to the stored energy. The current $i_n$ flows in the loop $M_{n2}$ through the second blocking element $D_n$, which is configured as a diode. The voltage $v_{cn}$ is applied to the second capacitor $C_n$. This is illustrated in FIG. 8. Due to the voltage $v_{cn}$, a current $i_b$ flows which charges the galvanic energy store 14.

Because the single coil L is used in each case if the positive voltage $v_{hp}$ is applied and if the negative voltage $v_{hn}$ is applied, the rectifier 9 is designed in a simple and compact manner Because only a single coil L is required, costs are also reduced. The coil L which is used jointly by the charging circuits 11 and 12 is not only a part of the rectifier 9, but is also used for starting operation of the supply circuit 16. Because the voltage $v_h$ of the energy harvester 2 is rectified in one step, the harvesting of electrical energy is optimized by means of the rectifier 9. In addition, the rectifier 9 enables the harvesting of electrical energy from an extremely low voltage $v_h$. The electromagnetically configured energy harvester 2 typically has a voltage from 1 mV to 1.2 V, in particular from 10 mV to 750 mV, and in particular from 50 mV to 500 mV.

The control device 10 is configured in such a way that an input impedance $Z_{in}$ at the input terminals 4, 5 is adjusted to the energy harvester 2, and the harvested electrical energy is thus optimized or maximized. The energy generator 1 or the device 3 thus enables or achieves so-called maximum power point tracking (MPPT). The control device 10 accordingly has a maximum power point tracking function. The measurement of a voltage, a current, or a zero-crossing detection or polarity detection is not required for this purpose. The device 3 is operated in a discontinuous conduction mode (DCM) and is an adjustable and purely ohmic element from the point of view of the energy harvester 2. The input impedance $Z_{in}$ or the input resistance of the device 3 is adjusted to the inner resistance of the energy harvester 2, whereby the maximum power point tracking is achieved. For the input impedance $Z_{in}$ of the device 3, the following is true:

$$Z_{in} = \frac{2 \cdot f_S \cdot L_0}{D^2} \quad (2)$$

where $L_0$ denotes the inductance value of the coil L, $f_s$ denotes the switching frequency, and D denotes the duty cycle. The input impedance $Z_{in}$ is set via the duty cycle D.

Due to the back-to-back arrangement, the electronic switching elements $Q_1$ and $Q_2$ are operated synchronously. In addition, the electronic switching elements $Q_1$ and $Q_2$ are operated in a corresponding manner in the first switching sequence, i.e., if the positive voltage $v_{hp}$ is applied, and in the second switching sequence, i.e., if the negative voltage $v_{hn}$ is applied. This means that the electronic switching elements $Q_1$ and $Q_2$ are closed in the respective first switching state $Z_{1p}$ or $Z_{1n}$, whereas the electronic switching elements $Q_1$ and $Q_2$ are open in the associated second switching state $Z_{2p}$ or $Z_{2n}$. Because the reference node $K_0$ is connected to the source terminals $S_1$ and $S_2$, the electronic switching elements $Q_1$ and $Q_2$ can be actuated directly by the control circuit 15 in a simple manner The adjustment of the input impedance $Z_{in}$ takes place via the design of the control circuit 15. By means of the comparators 18, 19, open-loop pulse width modulation is achieved. The first comparator 18 charges the capacitor $C_1$ via the ohmic resistor $R_3$ and compares the voltage $v_x$ to the voltage across the capacitor $C_1$ in such a way that the capacitor $C_1$ is discharged if the voltage across the capacitor $C_1$ is greater than the voltage $v_x$. As a result, the sawtooth voltage $v_s$ arises, which is applied across the capacitor $C_1$. The second comparator 19 compares the sawtooth voltage $v_s$ to the comparison voltage $v_y$ and generates the control signals $g_1$ and $g_2$. By means of the comparison of the sawtooth voltage $v_s$ to the comparison voltage $v_y$, the input impedance $Z_{in}$ is automatically determined, and the control signals $g_1$ and $g_2$ are generated in such a way that the input impedance $Z_{in}$ is adjusted to the energy harvester 2 by means of the duty cycle D. Since the energy harvester 2 enables essentially maximum energy harvesting at an input impedance $Z_{in}$ between 7Ω and 13Ω, an exact adjustment of the input impedance $Z_{in}$ to the energy harvester 2 is not necessary to ensure efficient energy harvesting. Fluctuations in the supply voltage $v_{cc}$ thus do not disadvantageously affect the efficiency of energy harvesting. The duty cycle D and the switching frequency $f_s$ may, for example, be set via the ohmic resistor $R_6$ and the capacitor $C_1$.

The control signals $g_1$ and $g_2$ are thus set with respect to time in such a way that the respective first switching state $Z_{1p}$ or $Z_{1n}$ is set for a duration of $0 < t < D \cdot T_s$, with reference to a period $T_s$, and the respective second switching state $Z_{2p}$ or $Z_{2n}$ is set for the duration $D \cdot T_s < t < (1-D) \cdot T_s$.

The galvanic energy store 14 which provides the voltage $E_b$ is charged by means of the voltages $v_{cp}$ and $v_{cn}$. The load 6 is supplied with electrical energy by means of the voltage $E_b$.

A second exemplary embodiment of the present invention will be described below with the aid of FIGS. 9 to 12. Unlike the first exemplary embodiment, the rectifier 9 does not comprise a galvanic energy store. The supply circuit 16 comprises a primary charge pump 17 and an auxiliary charge pump 22 for starting operation of the supply circuit 16 and for providing the supply voltage $v_{cc}$. An ohmic resistor $R_b$ corresponding to the first exemplary embodiment is not required.

The auxiliary charge pump 22 is connected to the input terminals 4, 5. The charge pump 22 is configured as a passive one-stage Villard charge pump. A fourth capacitor $C_{b1}$ is connected to the first input terminal 4 and a second node $k_2$. A second diode $D_{b1}$ is connected to the second input terminal 5 and the second node $k_2$ in such a way that the diode $D_{b1}$ enables a current flow from the second input terminal 5 to the node $k_2$. A fifth capacitor $C_{b2}$ is connected to the second input terminal 5 and a third node $k_3$. A third diode $D_{b2}$ is connected to the second node $k_2$ and the third node $k_3$ in such a way that the third diode $D_{b2}$ allows a current flow from the second node $k_2$ to the third node $k_3$. A fourth diode $D_{b3}$ is connected to the first node $k_1$ of the primary charge pump 17 in such a way that the fourth diode $D_{b3}$ allows a current flow from the third node $k_3$ to the first node $k_1$ and the reference node $K_0$. The primary charge pump 17 is configured corresponding to the charge pump 17 of the first exemplary embodiment.

Figure 10:
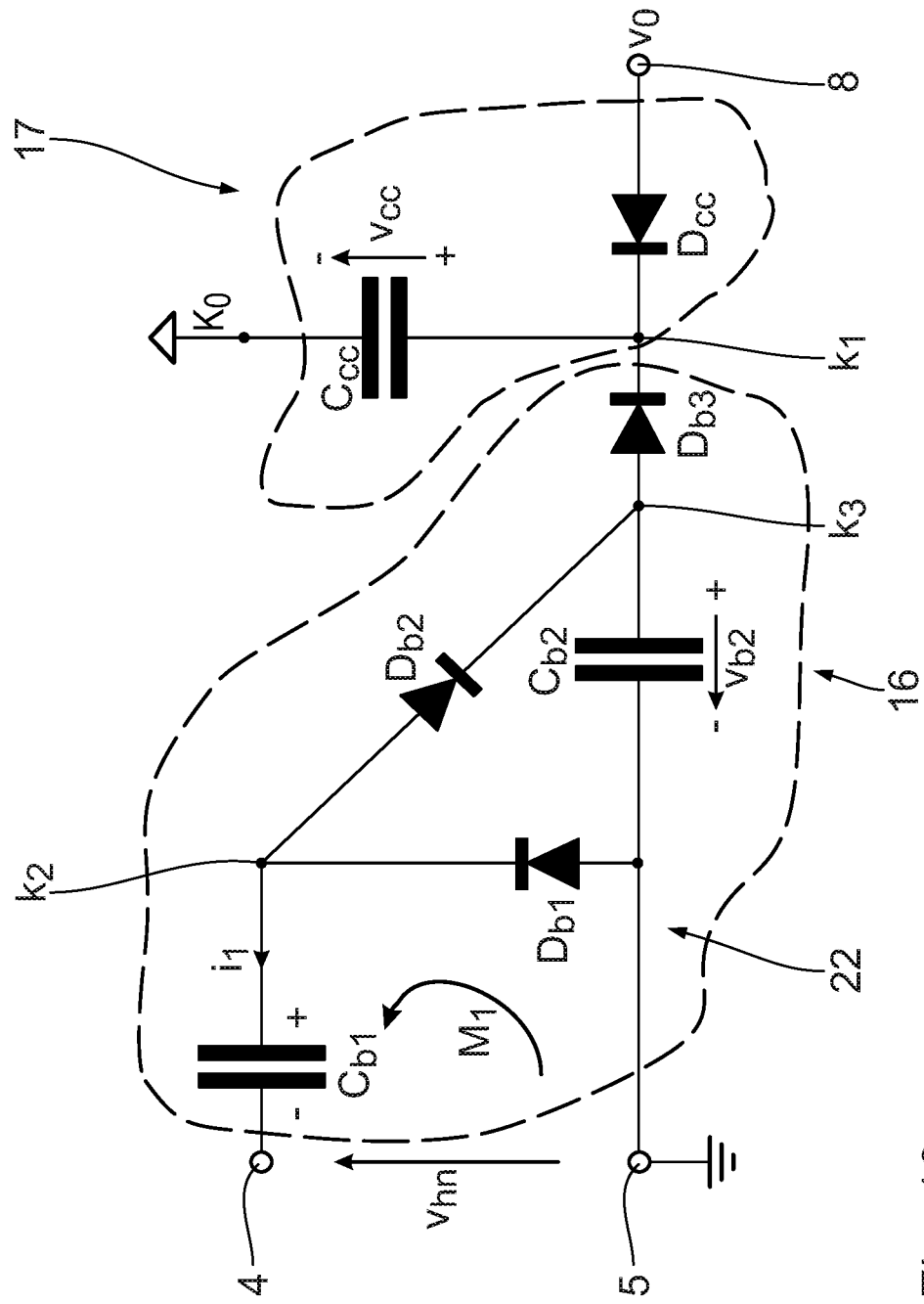
FIG. 10 depicts a circuit diagram of a supply circuit of the control device of the energy generator according to FIG. 9, in a first charging state.

The energy generator 1 enables starting operation of the control device 10 without a galvanic energy store. For this purpose, the auxiliary charge pump 22 is first put into operation, and the primary charge pump 17 is subsequently put into operation with it. In a few cycles after the excitement, the energy harvester 2 typically provides a comparatively high voltage $v_h$ which is subsequently reduced considerably due to damping. The auxiliary charge pump 22 is put into operation during these cycles. If the negative voltage $v_{hn}$ is applied, the capacitor $C_{b1}$ is charged via the diode $D_{b1}$. For this purpose, a charging current $i_1$ flows through the diode $D_{b1}$ to the capacitor $C_{b1}$. The active loop $M_1$ is illustrated in FIG. 10.

Figure 11:
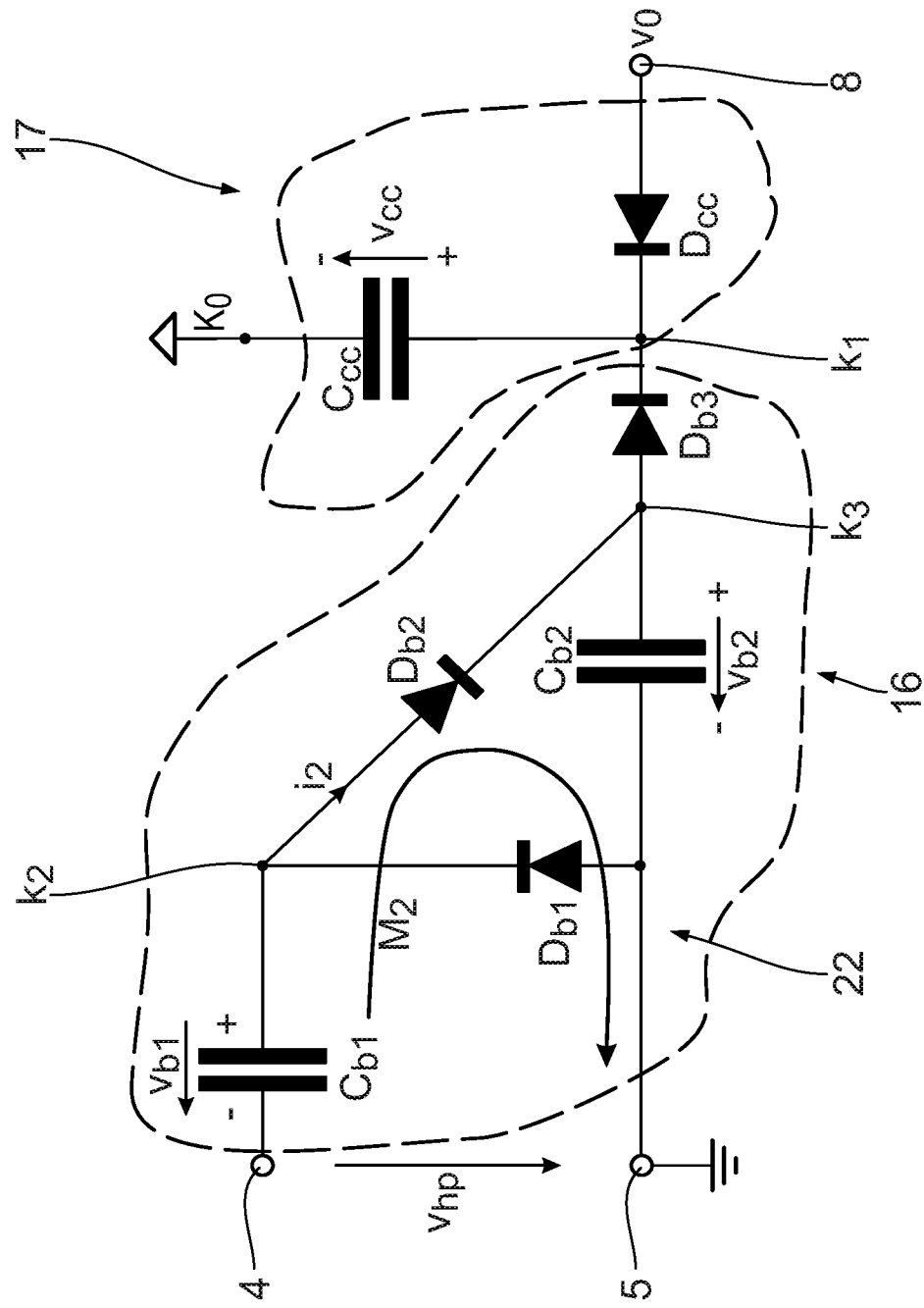
FIG. 11 depicts a circuit diagram of the supply circuit in a second charging state.

If the positive voltage $v_{hp}$ is subsequently applied, the charged capacitor $C_{b1}$ having the applied voltage $v_{b1}$ and the energy harvester 2 having the voltage $v_{hp}$ charge the capacitor $C_{b2}$ via the diode $D_{b2}$. The active loop $M_2$ and the charging current $i_2$ flowing through the diode $D_{b2}$ are illustrated in FIG. 11. For the voltage $v_{b2}$, the following is true:

$$V_b = 2 \cdot v_{hmax} - 2 \cdot V_D \quad (3)$$

where $v_{hmax}$ is the maximum voltage of the energy harvester 2 and $V_D$ is the threshold voltage.

Figure 12:
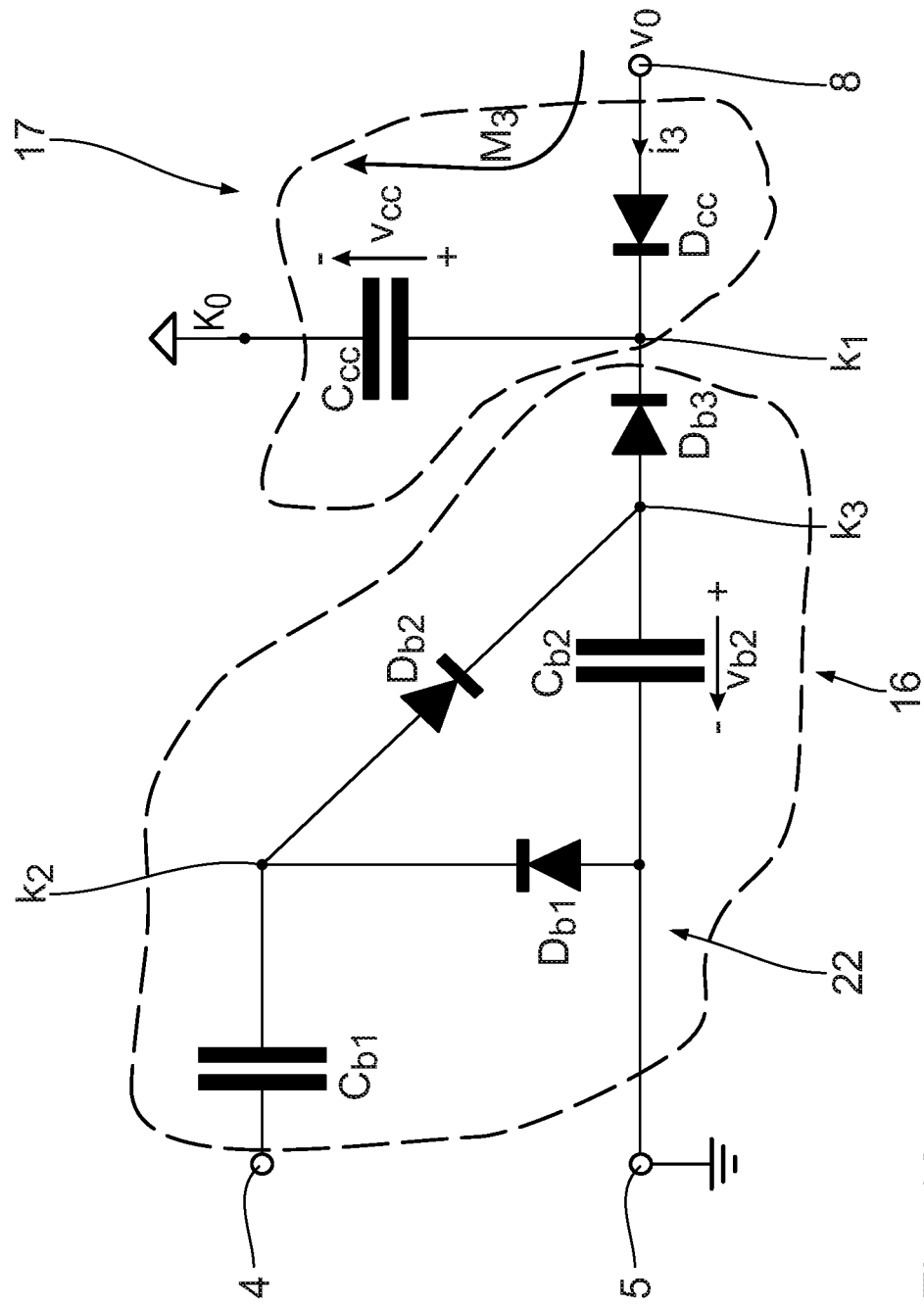
FIG. 12 depicts a circuit diagram of the supply circuit in a third charging state.

Subsequently, the capacitor $C_{cc}$ is charged via the diode $D_{b3}$, whereby the control circuit 15 is supplied with a sufficient supply voltage $v_{cc}$, and generates control signals $g_1$, $g_2$ for actuating the electronic switching elements $Q_1$, $Q_2$. As a result, the rectifier 9 is put into operation, and the output voltage $E_b$ increases. If $E_b$ is greater than the voltage $v_{b2}$, the auxiliary charge pump 22 is automatically deactivated. Only the primary charge pump 17 is then active. The diode $D_{b3}$ disconnects the auxiliary charge pump 22 from the primary charge pump 17, such that only the primary charge pump 17 is active. The active loop $M_3$ and the charging current $i_3$ are illustrated in FIG. 12. For the voltage $v_{cc}$, the following is true:

$$v_{cc} = v_0 + v_{hmax} - 2 \cdot V_D \quad (4)$$

where $v_0$ is the voltage at the input terminal 8. All diodes are preferably configured as Schottky diodes having a threshold voltage $V_D$ between 0.1 to 0.2 V.

A voltage controller 23 is connected to the output terminals 7, 8. The voltage controller 23 is used for stabilizing the voltage $E_b$, and provides a controlled output voltage $E'_b$ to output terminals 7', 8'. The load 6 is connected to the output terminals 7', 8'. Due to the changing charging state of the capacitors $C_p$ and $C_n$, the voltage $E_b$ at the output terminals 7, 8 fluctuates. The voltage controller 23 compares the voltage $E_b$ to a setpoint voltage $V_{ref}$ and provides the controlled voltage $E'_b$ on the output side. For this purpose, the voltage controller 23 comprises a DC-DC converter, of which the voltage $E'_b$ on the output side is controlled. For this purpose, the DC-DC converter is part of a voltage control circuit which compares the output-side voltage $E'_b$ to the setpoint voltage $V_{ref}$, and feeds a voltage difference between the setpoint voltage $V_{ref}$ and the output-side voltage $E'_b$ to a controller, which actuates the DC-DC converter for correcting the voltage difference. The controller is configured as a PID controller.

With respect to the further design and the further functionality of the energy generator 1, reference is made to the description of the first exemplary embodiment.

The invention claimed is:

1. A device for harvesting electrical energy, comprising
a rectifier comprising
a first input terminal and a second input terminal for connecting to an energy harvester,
a first output terminal and a second output terminal for providing an output voltage,
a first charging circuit for harvesting energy from a positive voltage of the energy harvester which is applied to the input terminals, comprising
an electronic switch, wherein the electronic switch comprises a series circuit which is made up of a first electronic switching element and a second electronic switching element,
a coil,
a first capacitor, and
a first blocking element,
a second charging circuit for harvesting energy from a negative voltage of the energy harvester which is applied to the input terminals, comprising
the electronic switch,
the coil,
a second capacitor, and
a second blocking element,
a control device for actuating the electronic switch, wherein the control device comprises at least one charge pump,
wherein one of the at least one charge pump is connected to one of the output terminals and a node between the first and second series-connected electronic switching elements of the electronic switch.

2. The device as claimed in claim 1, wherein the coil and the electronic are connected in series.

3. The device as claimed in claim 1, wherein the electronic switch comprises at least one body diode which is connected in parallel with a respective electronic switching element.

4. The device as claimed in claim 1, wherein a first body diode which is connected in parallel with the first electronic switching element, and a second body diode which is connected in parallel with the second electronic switching element, have opposite blocking directions.

5. The device as claimed in claim 1, wherein the coil, the first capacitor, and the first blocking element comprise a first loop for transmitting energy from the coil to the first capacitor.

6. The device as claimed in claim 1, wherein the coil, the second capacitor, and the second blocking element comprise a second loop for transmitting energy from the coil to the second capacitor.

7. The device as claimed in claim 1, wherein the blocking elements have different forward directions with respect to the coil.

8. The device as claimed in claim 1, wherein the first capacitor is connected to the first output terminal, and the second capacitor is connected to the second output terminal.

9. The device as claimed in claim 1, wherein the coil is connected to the first input terminal and a charging circuit node, the electronic switch is connected to the second input terminal and the charging circuit node, the first capacitor is connected to the charging circuit node and the first output terminal, the second capacitor is connected to the charging circuit node and the second output terminal, the first blocking element is connected to the first input terminal and the first output terminal, and the second blocking element is connected to the first input terminal and the second output terminal.

10. The device as claimed in claim 1, wherein the rectifier comprises a galvanic energy store which is connected to the output terminals.

11. The device as claimed in claim 1, wherein a voltage controller is connected to the output terminals.

12. The device as claimed in claim 1, wherein the control device comprises a control circuit for generating control signals, and a supply circuit for providing a supply voltage for the control circuit.

13. The device as claimed in claim 1, wherein a primary charge pump comprises a series circuit which is made up of a first diode and a third capacitor.

14. The device as claimed in claim 1, wherein an auxiliary charge pump is connected to the input terminals.

15. The device as claimed in claim 1, wherein an auxiliary charge pump is connected to a primary charging pump.

16. The device as claimed in claim 14, wherein the auxiliary charge pump comprises:
a fourth capacitor which is connected to the first input terminal and a second node,
a second diode which is connected to the second input terminal and the second node,
a fifth capacitor which is connected to the second input terminal and a third node, a third diode which is connected to the second node and the third node, and a fourth diode which is connected to the third node.

17. The device as claimed in claim 12, wherein the supply circuit comprises an ohmic resistor which is connected in parallel with the first capacitor.

18. The device as claimed in claim 1, wherein the control device comprises a first switching sequence if a positive voltage is applied to the input terminals, wherein the following is true for the first switching sequence:

|  | $Z_{1p}$ | $Z_{2p}$ |
|---|---|---|
| $Q_1$ | 1 | 0 |
| $Q_2$ | 1 | 0 | where $Q_1$ and $Q_2$ denote the two series-connected electronic switching elements of the electronic switch, $Z_{1p}$ and $Z_{2p}$ denote two consecutive switching states of the first switching sequence, and 1 means ON and 0 means OFF.

19. The device as claimed in claim 1, wherein the control device comprises a second switching sequence if a negative voltage is applied to the input terminals, wherein the following is true for the second switching sequence:

|  | $Z_{1n}$ | $Z_{2n}$ |
|---|---|---|
| $Q_1$ | 1 | 0 |
| $Q_2$ | 1 | 0 | where $Q_1$ and $Q_2$ denote two series-connected electronic switching elements of the electronic switch, $Z_{1p}$ and $Z_{2n}$ denote the two consecutive switching states of the second switching sequence, and 1 means ON and 0 means OFF.

20. The device as claimed in claim 12, wherein the control circuit comprises a first comparator for generating a sawtooth voltage and a second comparator for generating control signals for the electronic switch.

21. The device as claimed in claim 12, wherein the control circuit is configured in such a way that an input impedance at the input terminals is adjustable to the energy harvester by means of the generated control signals.

22. An energy generator comprising a device for harvesting electrical energy, comprising a rectifier comprising a first input terminal and a second input terminal for connecting to an energy harvester, a first output terminal and a second output terminal for providing an output voltage, a first charging circuit for harvesting energy from a positive voltage of the energy harvester which is applied to the input terminals, comprising an electronic switch, wherein the electronic switch comprises a series circuit which is made up of a first electronic switching element and a second electronic switching element, a coil, a first capacitor, and a first blocking element, a second charging circuit for harvesting energy from a negative voltage of the energy harvester which is applied to the input terminals, comprising the electronic switch, the coil, a second capacitor, and a second blocking element, a control device for actuating the electronic switch, wherein the control device comprises at least one charge pump and wherein one of the at least one charge pump is connected to one of the output terminals and a node between the two series-connected electronic switching elements of the electronic switch, and an energy harvester which is connected to the input terminals for providing an AC voltage.

23. The device as claimed in claim 15, wherein the auxiliary charge pump is connected to a first node.

24. A device for harvesting electrical energy, the device comprising:

a rectifier comprising a first input terminal and a second input terminal for connecting to an energy harvester, a first output terminal and a second output terminal for providing an output voltage, a first charging circuit for harvesting energy from a positive voltage of the energy harvester which is applied to the input terminals, comprising an electronic switch, wherein the electronic switch comprises a series circuit which is made up of a first electronic switching element and a second electronic switching element, a coil, a first capacitor, and a first blocking element, a second charging circuit for harvesting energy from a negative voltage of the energy harvester which is applied to the input terminals, comprising the electronic switch, the coil, a second capacitor, and a second blocking element, a control device for actuating the electronic switch, the control device comprising a control circuit for generating control signals, and a supply circuit for providing a supply voltage for the control circuit, the supply circuit comprising an ohmic resistor connected in parallel with the first capacitor.

* * * * *